United States Patent [19]

DeMello

[11] Patent Number: 4,909,667
[45] Date of Patent: Mar. 20, 1990

[54] METHOD AND APPARATUS FOR APPLYING A DAILY COVER TO DUMPED WASTE

[76] Inventor: Steven R. DeMello, 764 Bedford St., Bridgewater, Mass. 02324

[21] Appl. No.: 313,275

[22] Filed: Feb. 21, 1989

[51] Int. Cl.⁴ .............................................. E02B 3/12
[52] U.S. Cl. ..................................... 405/128; 405/129
[58] Field of Search ............... 405/128, 129, 270, 258; 156/575; 47/9

[56] References Cited

U.S. PATENT DOCUMENTS

| | | | |
|---|---|---|---|
| 473,009 | 4/1892 | Lyon | 405/270 |
| 1,276,887 | 8/1918 | Eckart | 405/38 X |
| 2,143,461 | 1/1939 | Waring | 47/9 |
| 3,166,458 | 1/1965 | Chinn et al. | 156/575 X |
| 3,181,455 | 5/1965 | Gouker et al. | 47/9 X |
| 3,315,408 | 4/1967 | Fisher | 47/9 |
| 3,568,453 | 3/1971 | Ziegenmeyer | 47/9 X |
| 3,822,556 | 7/1974 | Cramwinckel et al. | 405/270 |
| 4,519,338 | 5/1985 | Kramer et al. | 405/129 X |
| 4,796,711 | 1/1989 | Chrysler | 47/9 X |

OTHER PUBLICATIONS

Municipal Landfills Using Double Liners: Seven Case Studies; Waste Age/Oct. 1985, pp. 61–70.

Primary Examiner—Dennis L. Taylor
Attorney, Agent, or Firm—Robert J. Doherty

[57] ABSTRACT

A method and apparatus for applying a "daily cover" to the working face of a landfill. A sheet-like member preferably of imperforate construction such as canvas and the like is positioned at the end of a working day at one edge of the working face such that one edge of the member is adjacent thereto. The member is then fixed to the landfill and then unrolled to its extended position to cover at least a significant portion of the working face and thus obviate the need for a conventional "daily cover" in the form of six inches to two feet of compacted earth.

5 Claims, 2 Drawing Sheets

4,909,667

METHOD AND APPARATUS FOR APPLYING A DAILY COVER TO DUMPED WASTE

BACKGROUND AND OBJECTS OF THE INVENTION

This invention relates to an improved method and apparatus of providing a daily cover to overlie and, in effect, seal dumped waste such as trash, garbage, fly ash and bottom ash in a landfill or other dump area.

It is common in landfill or dump operations which receive garbage, trash and/or ash deposits during the day to provide a covering layer of compacted earth approximately six inches to two feet deep at the end of the day. This earth layer is to prevent the escape of odors, the blowing of papers and other trash into the adjacent area, the proliferation of pests such as flies, rodents, and birds, and the leaching of toxic or disagreeable components from the dumped material. This cover material provision often termed "daily cover" is frequently required by municipal, state, and/or federal regulations which govern such landfill or dump operations.

The task of placing and compacting an earth "daily cover" represents a very significant portion of the landfill operating cost since it employs significant labor and heavy equipment. Such compacted earth cover performs its principle function only for a day or so, that is, each day's garbage or trash layer is covered at the end of the day and further garbage and trash layers are then piled directly on top of the previous day's "daily cover."

Besides the cost of applying the compacted earth cover, it is recognized that multiple earth fill layers used in this way consume a significant volume of the valuable landfill space which might otherwise be used for receiving garbage or trash. It is well known that many areas are rapidly exhausting their available landfill acreage and reducing the consumption rate of the available landfill volume is, accordingly, desirable.

An alternate solution to the provision of such compacted earth cover has been proposed and described in U.S. Pat. Nos. 4,421,788 and 4,519,338 in which means are disclosed for coating the landfill surface with a non-biodegradable plastic foam spray which, in effect, provides the "daily cover." Such process, however, utilizes high pressure spray equipment which tends to blow away the debris. Although this foam spray method reduces the volume consumed by the compacted earth layer alternative, such method still adds a small amount of undesirable volume to the landfill. In addition, the proposed plastic spray solution is expensive, and its applicability limited to dry climates and may even add its own contamination to the landfill depending on the plastic foam utilized.

Accordingly, it would be desirable to provide a "daily cover" for such landfills which utilizes no additional space therein and accomplishes its overall objectives in a straightforward, relatively inexpensive and low tech manner. These and other objects of the present invention are accomplished by the provision of a daily cover for a working face of a landfill having a surface roughly defined by a front laterally extending edge and a rear edge longitudinally separated therefrom, comprising providing a sheet-like member in a compacted form, said member having an extended length and width to cover at least a substantial portion of said working face, said member having a laterally extending trailing edge, fixedly positioning said trailing edge onto said landfill working face at a position longitudinally remote from said front edge thereof and thereafter moving the remaining portions of said member towards said front edge so as to extend said member and cover said working face.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DETAILED DESCRIPTION OF THE INVENTION

Figure 1:
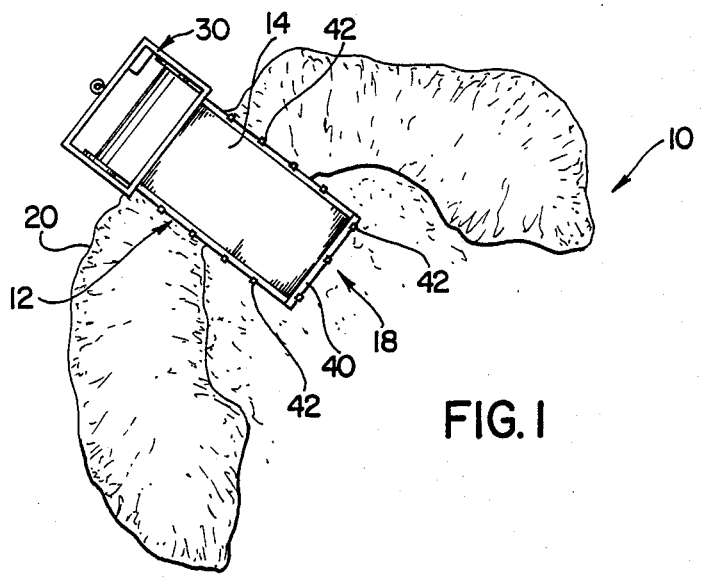
FIG. 1 is a top plan view showing a landfill and a working face thereof with the device of the present invention in position.
Figure 2:
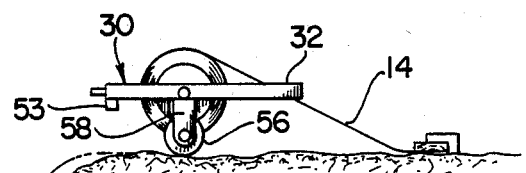
FIG. 2 is a schematic elevational view of FIG. 1 showing the manner in which the cover member of the present invention may be applied to the working face of the landfill.
Figure 2:
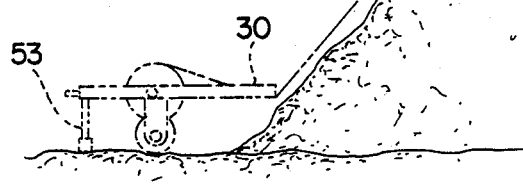

Turning now to the drawings and more particularly FIGS. 1 and 2 thereof, a landfill 10 or a portion thereof is depicted including a working face 12. By working face, it is meant that landfill portion 10 that is being worked at the present time, that is, the normally downwardly sloping face onto which trash, garbage and like is dumped and thereafter compacted. Normally such compacting is done periodically through the landfill working day and then prior to end thereof a working cover provided thereon such that loose trash such as papers and the like are not blown away overnight and some protection is provided against scavengers and from run off inherent in the dumped mass itself or from wet weather conditions. The extent of such working face 12 is, of course, dependent on the particular landfill being considered, but normally it is somewhere between forty and two hundred feet in lateral extent with the longitudinally sloping dimension dependent upon the particular site but generally within the range of fifty and two hundred feet. In addition while the present invention will be described in relationship to a sloping working face 12, it should be brought out that the working face need not be sloping but may be even a flat portion of an overall landfill, the important aspect being that it is the portion of the landfill being worked which causes the problems the present invention solves.

The crux of the present invention is the provision of a rolled sheet-like member 14 which in its extended position acts as a cover for all or a substantial portion of the working face 12 such that it may be substituted for the normal "daily cover" now provided in such landfill sites, that is, an additional layer of dirt to provide such cover.

The member 14 is preferably of heavy-duty canvas material and exhibits a trailing edge 16 which is adapted to be pinned or otherwise secured to a rear landfill edge 18 and then extended to cover the working surface thereof such that a portion of the member thereafter overlies the front laterally extending landfill edge 20. Stated differently, it is the overall intent for the member 14 to cover the working face 12 of the landfill with the proviso that it is, of course, possible with large working faces that two or more members 14 may be laid laterally side by side with some overlap to assure the desirable features of the present invention are accomplished. Generally, such canvas or other material should be waterproof and flame retardant so as to meet existing state, etc. requirements for a dirt cover although in some environments may be of an open mesh or net-like construction. Also, the material sheet may be formed from suitable plastic resin materials such as polypropylene.

The trailing edge 16 of the member 14 (as well as the side edges in some cases) is preferably provided with a series of reinforced eyelets or openings 22 which extend through the body of the member 14 in a laterally extending line and used for a purpose which will hereinafter be more fully defined. The member 14 is normally presented in a rolled form upon a device such as a carriage 30 provided for such purpose such that at the conclusion of the landfill working day, the member 14 in rolled form is positioned adjacent the inner edge 18 of the working face 12. Thereafter, the trailing edge 16 thereof is placed on the landfill surface after which transversely extending elongated members such as pieces of wood 40 are laid parallel to the line of openings 22 and thereafter stakes 42 driven through the openings 22 to force the wooden members 40 into pinning contact with the member 14 upper surface. The stakes 42 besides exhibiting a normal body 44 having a pointed end 46 include an inwardly extending generally L-shaped head 46 which terminates in a downwardly extending point 48 adapted to extend into but not through the wooden member 40 such that the desired pinning contact with the member 14 is effected without tearing such member. It should also be pointed out that the stakes 42 may have a more conventional flattened upper head 46, the under surfaces of which are smooth and provide the pinning contact between the member 14 upper surfaces and the landfill supporting surface 10.

Thereafter, the remaining rolled or otherwise compacted portions of the sheet-like member 14 are extended downwardly across the working face 12 until reaching the front edge thereof; thus, in effect, providing a substitute "daily cover" for the working face 12. The member 14 remains in such position until just prior to the subsequent working day when it is removed such that additional trash and garbage may be piled and compacted against the working face 12 thus forming a new working face which is then recovered at the end of the next day and so on.

Figure 3:
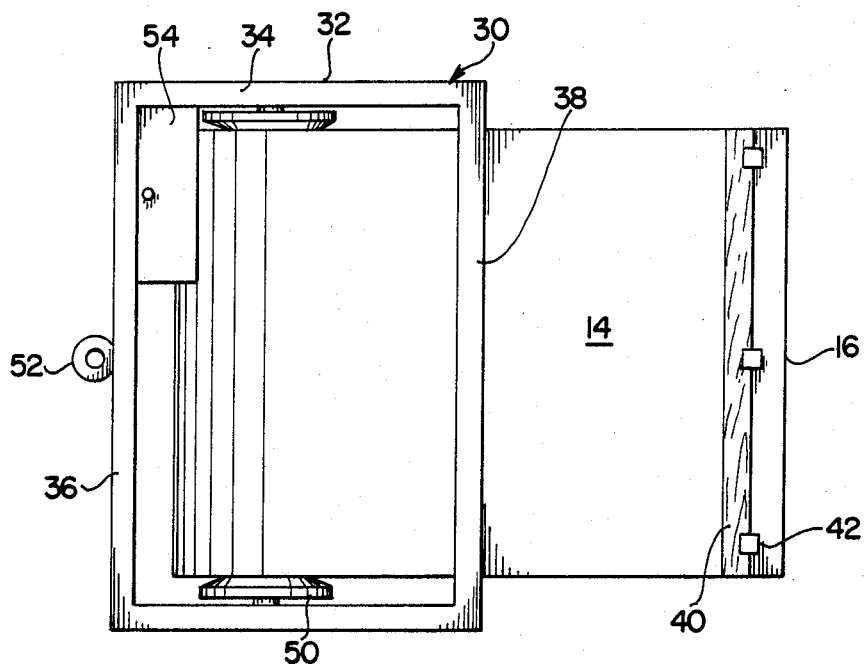
FIG. 3 is top plan view of the carriage which houses the rolled cover member.
Figure 4:
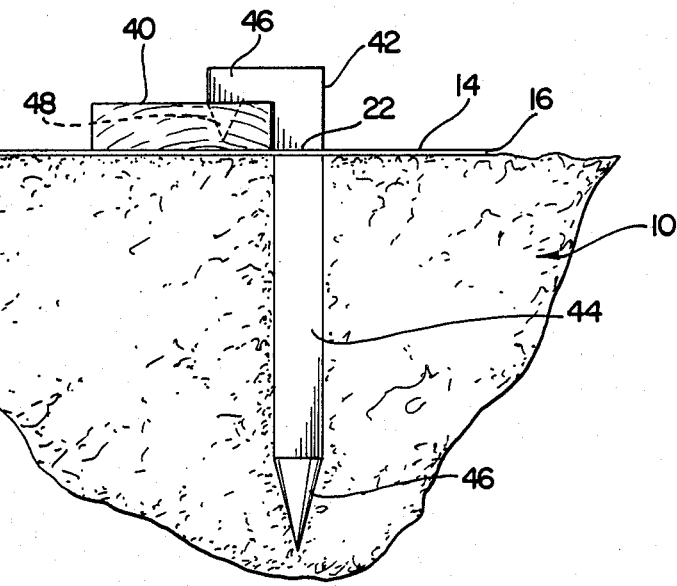
FIG. 4 is an enlarged sectional view showing the manner in which specially provided pegs or stakes may be utilized to fix the trailing edge of the member to the landfill.

Turning again to the drawings and particularly FIG. 3 thereof, the carriage 30 of the present invention is best shown. Such carriage 30 includes an open frame 32 comprising a pair of laterally opposed side pieces 34 in turn integrally attached to a front beam 36 and a rear beam 38. A roller 50 extends between the side pieces or beams 32 and is mounted for rotation with respect thereof. Such rotation may be free or by means of a gear or other power-driven system not shown. The member 14 leading edge (not shown) is conventionally fixed to the roller 50 and thence the remainder of the member 14 wound thereon to present an enlarged roll adapted to be suspended between the lateral extents of such frame 32.

The front beam 36 is further provided with a hitch 52 such that the carriage 30 may be attached to and maneuvered into the desired position by a tractor or other commonly used landfill compacting and trash/earth moving equipment. Such beam may also include a crank or otherwise operated landing gear 53 or other support, leg or the like such that the front end of the carriage may be supported at a predetermined height to facilitate connection of the hitch 52 to a tractor or other piece of equipment.

Also, a tool box 54 is conveniently provided between two adjacent beams and as shown in FIG. 3 extends above the member 14 as its trailing edge downwardly is, in effect, threaded below the rear beam 38 to assume its position adjacent the rear edge 18 of the working face 12. After the trailing edge 16 is so positioned, the tractor via the hitch 52 will slowly move the carriage 30 down the working face 12 into the position shown by the dotted lines in FIG. 2 where it remains until the subsequent landfill working day is to commence whereupon the tractor is now utilized to push the carriage slowly up the working face 12 while the roller 50 is simultaneously manually or mechanically wound to take up the member 14 extending across the working face and reroll the member upon the roller 50. In this regard, the rear beam 38 may be provided with brushes (not shown) or other mechanisms downwardly and upwardly extending therefrom to contact either one or both member 14 surfaces to remove trash, garbage and the like therefrom prior to being rerolled and stored. In the instructional example shown in the drawings, however, such brushes are omitted and the rear beam 38 lower surface in effect by contacting the member 14 upper surface as the carriage is forced up the working face 12 tends to dislodge any such trash or garbage that may adhere to the under face of the member 14.

In order to facilitate the above described movement of the carriage 30, the frame 30 is provided with wheels 56 which downwardly extend from opposite sides of the side pieces 34 via trunnion members 58. It should also be pointed out that various reinforcing beams or pieces (not shown) may be utilized to strengthen or assure the frame is of satisfactorily rigid construction for the intended purpose.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An improved landfill management process comprising the method of providing a daily cover for a working face of a landfill having a surface roughly defined by a front laterally extending edge and a rear edge longitudinally separated therefrom, including providing a sheet-like member in a compacted storage form, said member having an extended length and width to cover at least a substantial portion of said working face, said member having a laterally extending trailing edge, fixedly positioning said trailing edge onto said landfill working face at a position longitudinally remote from said front edge thereof, thereafter at the end of the landfill working day moving the remaining portions of said member towards said front edge so as to extend said member and cover said working face and then removing said material prior to the subsequent landfill workday so as to provide dumping access to said working face.

2. The method of claim 1, wherein said material is in a laterally extending roll and wherein said roll is accordingly unrolled over said working face towards said front edge.

3. The method of claim 2, including the steps of unrolling said material at the end of the landfill workday and re-rolling said material prior to the subsequent landfill workday so as to provide dumping access to said working face.

4. The method of claim 1, wherein said sheet-like material is a heavy-duty canvas which is imperforate to water and flame retardant.

5. The method of claim 2, including providing said material with a line of transversely-separated openings proximal said trailing edge, placing an elongated member on top of said material adjacent said line and thereafter driving stakes through said openings and in simultaneous contact with said member so as to force said member and said material against said working face.

* * * * *